(12) United States Patent
Amer et al.

(10) Patent No.: US 11,272,191 B2
(45) Date of Patent: Mar. 8, 2022

(54) CONTROLLING POWER CONSUMPTION IN VIDEO ENCODING BASED ON INFORMATION REGARDING STATIC AMOUNT OF AN IMAGE FRAME

(71) Applicant: ATI Technologies ULC, Markham (CA)

(72) Inventors: Ihab M. A. Amer, Stouffville (CA); Khaled Mammou, Thornhill (CA); Benedict Chien, Aurora (CA); Lei Zhang, Richmond Hill (CA); Stephen A. J. Bagshaw, Markham (CA); Naveed A. Gazi, Toronto (CA); Zhiqi Hao, Richmond Hill (CA); Ping Chen, Markham (CA); Li Baochun, Toronto (CA); Syed Hussain, Scarborough (CA)

(73) Assignee: ATI TECHNOLOGIES ULC, Markham (CA)

( * ) Notice: Subject to any disclaimer, the term of this patent is extended or adjusted under 35 U.S.C. 154(b) by 76 days.

(21) Appl. No.: 14/535,551

(22) Filed: Nov. 7, 2014

(65) Prior Publication Data

US 2016/0134865 A1    May 12, 2016

(51) Int. Cl.
| | | |
|---|---|---|
| *H04N 19/176* | (2014.01) | |
| *H04N 19/85* | (2014.01) | |
| *H04N 19/127* | (2014.01) | |
| *H04N 19/137* | (2014.01) | |
| *H04N 19/159* | (2014.01) | |

(52) U.S. Cl.
CPC ......... *H04N 19/176* (2014.11); *H04N 19/127* (2014.11); *H04N 19/137* (2014.11); *H04N 19/85* (2014.11); *H04N 19/159* (2014.11)

(58) Field of Classification Search
CPC .. H04N 19/105; H04N 19/139; H04N 19/176; H04N 19/127; H04N 19/137; H04N 19/85; H04N 19/159
See application file for complete search history.

(56) References Cited

U.S. PATENT DOCUMENTS

| | | | | |
|---|---|---|---|---|
| 8,619,861 | B2 * | 12/2013 | Zuo .................... | H04N 19/139 |
| | | | | 375/240.01 |
| 9,225,979 | B1 * | 12/2015 | Jia ........................ | H04N 19/137 |
| 2005/0100229 | A1 * | 5/2005 | Becker ................ | H04N 19/147 |
| | | | | 382/232 |
| 2007/0085712 | A1 * | 4/2007 | Hiranaka .............. | H04N 19/70 |
| | | | | 341/50 |
| 2013/0128948 | A1 * | 5/2013 | Rabii ..................... | H04N 19/12 |
| | | | | 375/240.01 |
| 2014/0086310 | A1 * | 3/2014 | Tanner ................ | H04N 19/132 |
| | | | | 375/240.03 |
| 2016/0098814 | A1 * | 4/2016 | Edso ....................... | G06T 1/60 |
| | | | | 345/547 |

\* cited by examiner

*Primary Examiner* — Hesham K Abouzahra (57) ABSTRACT

An apparatus and methods for controlling power consumption in video encoding obtain, before motion estimation is performed on an image frame to be encoded, information regarding an amount of the image frame to be encoded that is static with respect to a previously encoded image frame. The apparatus and methods adjust power consumption of the video encoder based on the obtained information regarding the amount of the image frame to be encoded that is static.

14 Claims, 5 Drawing Sheets

CONTROLLING POWER CONSUMPTION IN VIDEO ENCODING BASED ON INFORMATION REGARDING STATIC AMOUNT OF AN IMAGE FRAME

FIELD OF THE DISCLOSURE

The disclosure relates generally to video encoding and more particularly to methods and apparatus for controlling power consumption in video encoding.

BACKGROUND OF THE DISCLOSURE

In many video encoding use cases, input video (e.g., input sequences of image frames) includes a significant number of static areas. That is, the input video frequently includes a significant number of areas that do not change between successive image frames. Moreover, such areas are often static for relatively long periods of time as compared to, for example, the time taken to render one image frame. A conventional video encoder will perform motion compensation by performing calculations that have the effect of searching, for each region (e.g., a 16×16 pixel macroblock) in a current frame, for the best possible match to that region within a previously encoded reference frame. A conventional video encoder will then determine and encode a motion vector that indicates the transformation between the region in the current frame and the best possible match to that region in the previously encoded frame. In the case of a static region or area, the calculations performed during motion estimation will indicate that the motion vector is (0,0)—that is, that the best possible match to the region under consideration in the current frame is a region in the previously encoded frame that is located at the same position in the previously encoded frame as the region under consideration in the current frame.

Upon eventually determining that the motion vector for such a region in the current image frame is (0,0), conventional encoders will encode such a region in a manner that indicates that the region is static with respect to the same region of the previously encoded image frame. For example, conventional encoders for H.264 and other video encoding standards will set a particular flag known as a SKIP flag indicating that the region under consideration in the current frame is to be encoded in SKIP mode. Encoding a region (e.g., macroblock) of an image frame in SKIP mode results in some gains in efficiency. However, in order to achieve any such gains in efficiency, the conventional encoder will need to perform the aforementioned calculations to determine that the region of the image frame is to be encoded as SKIP. Performing these calculations to yield an ultimate conclusion that the region under consideration is to be encoded as SKIP overshadows much of the gains in efficiency that are realized once it is eventually determined to use the SKIP mode.

Some techniques for increasing efficiency (e.g., saving power consumption) in video encoding rely on reducing power consumption based on input video resolution and target frame rate. While these techniques achieve some efficiencies, they do not improve the efficiency of determining that a region in an image frame is to be encoded using a SKIP mode or other mode indicating that the region in the image frame is static with respect to the same region of the previously encoded image frame.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, methods and apparatus for controlling power consumption in video encoding reduce power consumption of an apparatus that employs video encoding (e.g., a mobile or smart phone, a phablet, a tablet, a camera, a laptop computer, portable media player, or any other suitable device which employs video encoding) are disclosed. In one embodiment, a method and an apparatus (e.g., a smart phone including a graphics processing unit (GPU) which in turn includes a video encoder) adjust power consumption of a video encoder based on information regarding an amount of an image frame to be encoded that is static with respect to a previously encoded image frame. The method and apparatus may obtain the information regarding the amount of the image frame to be encoded that is static, before encoder logic performs motion estimation on the image frame to be encoded, in any of a number of suitable ways such as in one or more of the example ways discussed below.

Among other advantages, for example, the disclosed methods and apparatus allow information to be obtained regarding an amount of the image frame to be encoded that is static before performing computation-intensive operations such as motion estimation. As a result, the methods and apparatus may determine that static regions of the image frame are to be encoded in a manner that indicates that the region is static with respect to the same region of the previously encoded image frame, such as in a SKIP mode, before motion estimation is performed. Because encoding in the SKIP mode requires fewer computations, the clock frequency of the video encoder may be adjusted (e.g., reduced) while still allowing an image frame to be encoded in the time desired. Other advantages will be recognized by one of ordinary skill in the art.

In one example, the information regarding the amount of the image frame to be encoded that is static may be obtained from at least one of a gaming application (e.g., executing on a GPU and/or a central processing unit (CPU) of a device, such as a smart phone, that includes the video encoder); a display engine of the device that includes the video encoder; a video decoder (e.g., a video decoder of a transcoder that also includes the video encoder); and processing by pre-encoding logic associated with the video encoder. In one embodiment, pre-encoding logic may process the image frame to be encoded and the previously encoded image frame as further described below, and may generate the information regarding the amount of the image frame to be encoded that is static based on the results of such processing. In one example, the pre-encoding logic may be physically distinct from the video encoder and may provide the generated information to the video encoder. In another example, the pre-encoding logic may be included in the video encoder.

In another example, the methods and apparatus may obtain the information regarding the amount of the image frame to be encoded that is static by obtaining a binary indication of whether each of multiple regions of the image frame to be encoded is static. Additionally or alternatively, the methods and apparatus may obtain the information regarding the amount of the image frame to be encoded that is static by obtaining coordinate information indicating a region of the image frame to be encoded that is not static. In one example, the coordinate information may include two coordinates that define a rectangular region of the image frame to be encoded that is not static.

In some embodiments, the methods and apparatus may obtain the information regarding the amount of the image frame to be encoded that is static by obtaining at least one of information regarding a location of a static region of the image frame to be encoded and an indication of a percentage of the image frame to be encoded that is static. The methods and apparatus may determine, based on the percentage of the image frame to be encoded that is static, whether to adjust an operating mode of the video encoder to an operating mode indicating that a region of the image frame to be encoded is static. For example, the methods and apparatus may determine whether to adjust a default operating mode of the video encoder to a SKIP mode so as to first evaluate each region (e.g., macroblock) of the image frame as encoded using the SKIP and thereby determine whether to ultimately use the SKIP mode in encoding that region of the image frame.

In yet another example, the methods and apparatus may obtain the information regarding the amount of the image frame to be encoded that is static by obtaining information regarding a correlation between the image frame to be encoded and the previously encoded image frame. For example, pre-encoding logic associated with the video encoder (e.g., that is in communication with the video encoder or that is part of the video encoder) may subtract the image frame to be encoded from the previously encoded image frame to determine the correlation. Such a correlation, as the result of subtracting the image frame to be encoded from the previously encoded image frame, may indicate displacement between the two image frames in the horizontal and vertical directions and may thus allow determination of an amount of the image frame to be encoded that is static with respect to the previously encoded image frame.

In some embodiments, adjusting the power consumption of the video encoder includes adjusting a clock frequency of the video encoder based on the information regarding the amount of the image frame to be encoded that is static. For example, with knowledge of the reduced amount of computational resources needed to encode a region using the SKIP mode, and with knowledge of the overall amount of time in which the image frame is to be encoded, the desired clock frequency may be calculated and adjusted accordingly.

Among other advantages, the methods and apparatus allow adjustment of power consumption of a video encoder, such as by adjusting a clock frequency of the video encoder, based on information—obtained before performing video encoding operations such as motion estimation—regarding an amount of an image frame that is static. The methods and apparatus may advantageously obtain the information regarding the amount of the image frame to be encoded that is static in any of a number of suitable ways, such as from a gaming application, a display controller, a video decoder, or from processing by pre-encoding logic associated with the video encoder (e.g., by obtaining, from the pre-encoding logic, the result of a correlation between the image frame to be encoded and a previously encoded image frame). Accordingly, the methods and apparatus may encode static regions of an image frame using, for example, a less computationally-demanding SKIP mode based on knowledge of the amount of the image frame that is static. Other advantages of the subject matter disclosed herein will be recognized by those of ordinary skill in the art.

Figure 1:
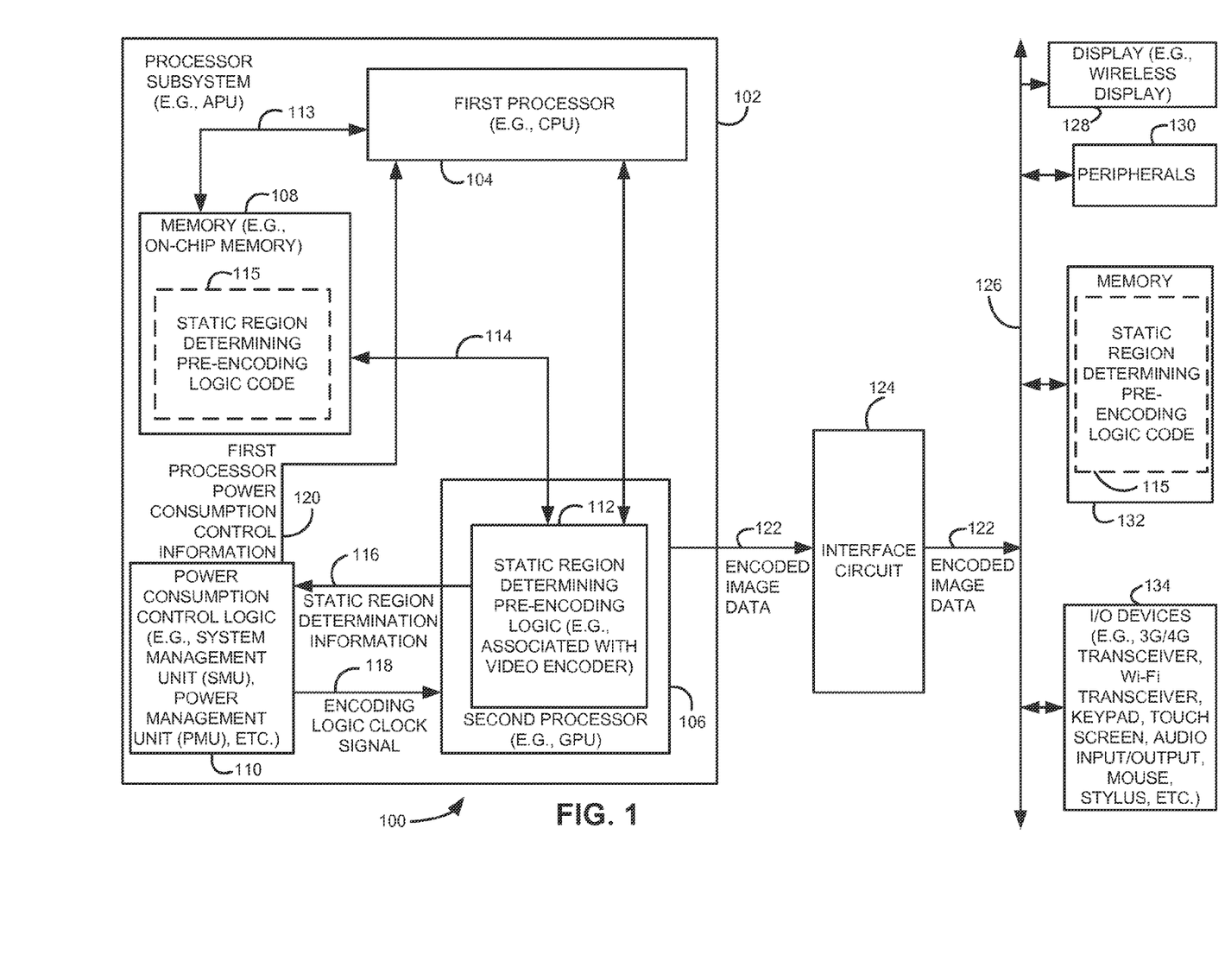
FIG. 1 is a functional block diagram illustrating an example apparatus, including pre-encoding logic which may be associated with a video encoder, for determining an amount of an image frame to be encoded that is static.

FIG. 1 is a functional block diagram illustrating an example apparatus 100 including pre-encoding logic which may be associated with a video encoder, such as in example implementations described above and discussed in further detail below, in order to determine an amount of an image frame to be encoded that is static. The apparatus 100 may be, for example, any suitable device with video encoding capability such as, but not limited to, a mobile or smart phone, a phablet, a tablet, a laptop computer, a camera, portable media player, or any other suitable device including any suitable battery-equipped device, etc. In one embodiment, the pre-encoding logic is implemented within a GPU as further described below.

More particularly, as illustrated in FIG. 1, the apparatus 100 includes a processor subsystem 102, which includes a first processor 104 such as a CPU, a second processor 106 such as a GPU, a memory 108 such as an on-chip memory, and power consumption control logic 110 which may be or may include, for example, a System Management Unit (SMU) or a Power Management Unit (PMU). The second processor 106 may include static region determining pre-encoding logic 112, which may be associated with (e.g., in communication with or part of) a video encoder included in the second processor 106. The memory 108 may communicate with, for example, the first processor 104 by way of a communication link 113 and with the second processor 106, such as with the static region determining pre-encoding logic 112, by way of a communication link 114. Each of the communication links 113 and 114 may be any suitable bus or other type of communication link.

In some embodiments, the processor subsystem 102 may be an accelerated processing unit (APU), which as known in the art includes one or more CPU cores and one or more GPU cores on the same die. Such an APU may be, for example, an APU as sold by Advanced Micro Devices, Inc. (AMD) of Sunnyvale, Calif. Alternatively, one or more of the first and second processors 104 and 106 may perform general-purpose computing on GPU (GPGPU), may include one or more digital signal processors (DSPs), one or more application-specific integrated circuits (ASICs), or the first and second processors 104 and 106 may be any suitable processors.

In some examples, the described static region determining pre-encoding logic 112, and/or the power consumption control logic 110 and/or other logic described herein, may be implemented by executing suitable instructions on, for example, the first processor 104 and/or the second processor 106. In other examples, the described static region determining pre-encoding logic 112, and/or the power consumption control logic 110, and/or other logic described herein may be implemented by storing executable instructions on a computer readable storage medium, where the executable instructions are executable by one or more processors (e.g., the first processor 104 and/or the second processor 106) to cause the one or more processors to perform the actions described herein. For example, executable instructions may be stored in the memory 108 or any suitable memory and may include static region determining pre-encoding logic code 115. The described static region determining pre-encoding logic 112, and/or the power consumption control logic 110 and/or other logic described herein, may also be implemented in any other suitable manner such as but not limited to a firmware implementation, a hardware implementation, or any suitable combination of the example implementations described above.

Figure 2:
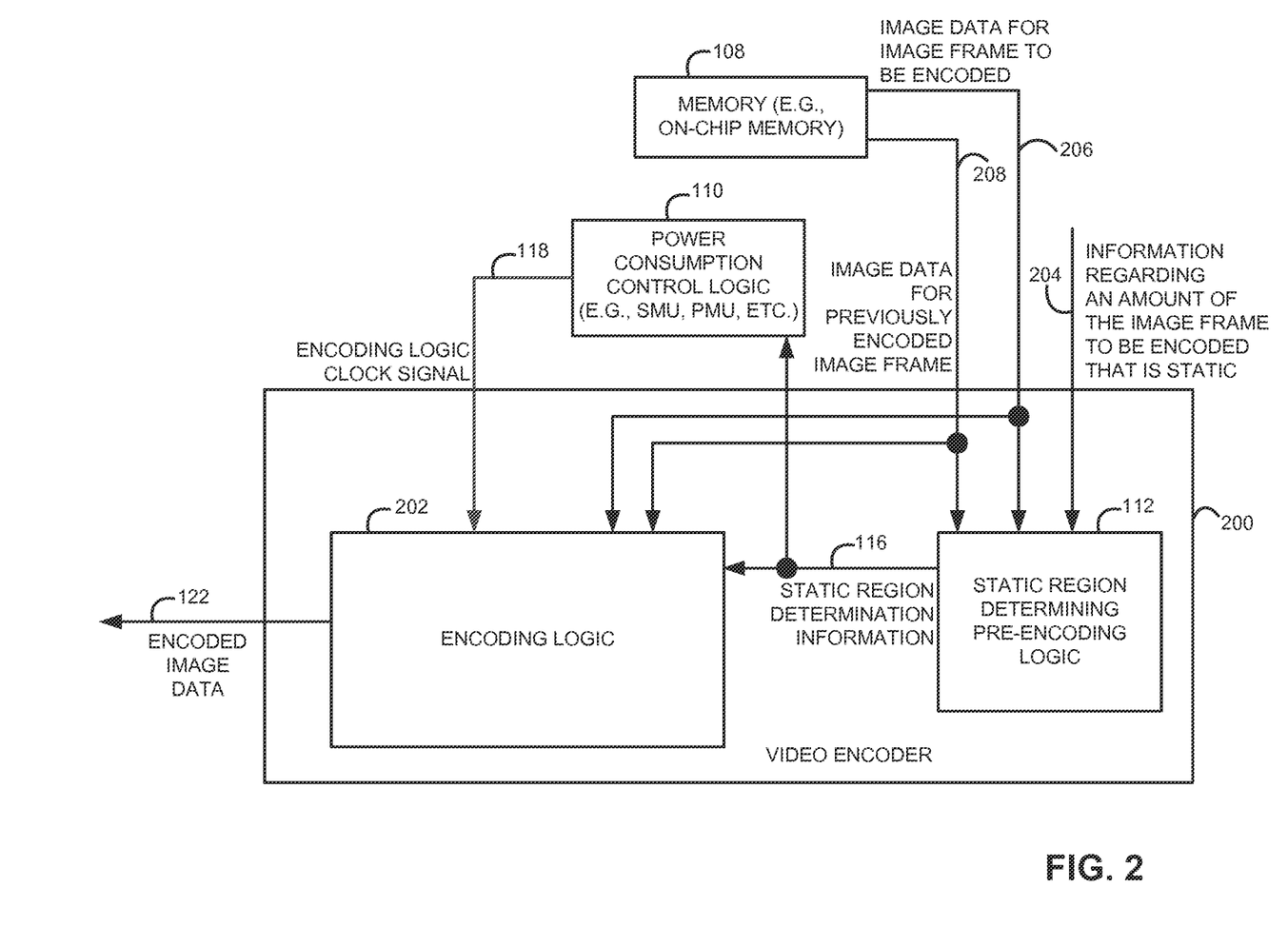
FIG. 2 is a functional block diagram illustrating an example of further detail of the operation of the pre-encoding logic associated with the video encoder.

As further discussed with respect to FIG. 2 and subsequent figures, the static region determining pre-encoding logic 112 obtains information regarding the amount of the image frame to be encoded that is static. In various examples, as further described below, the information regarding the amount of the image frame to be encoded that is static may be obtained from the first processor 104, other components of the second processor 106, the memory 108, any other suitable memory, and/or any other suitable location including a location remote from the apparatus 100. The static region determining pre-encoding logic 112 uses the obtained information regarding the amount of the image frame to be encoded that is static to generate static region determination information 116. The static region determination information 116 indicates which regions (e.g., macroblocks) in the image frame to be encoded are static, as further discussed below. The static region determining pre-encoding logic 112 provides the static region determination information 116 to the power consumption control logic 110, and the power consumption control logic 110 adjusts the power consumption of the video encoder accordingly. For ease of illustration and explanation, this adjustment is shown by the power consumption control logic 110 providing an encoding logic clock signal 118 to the second processor 106, which as noted above may include the video encoder. If desired, and as shown in FIG. 1, the power consumption control logic 110 may also provide first processor power consumption control information 120 to the first processor 104, such as when the first processor 104 supports video encoding operations or when the desired power consumption of the first processor 104 is otherwise affected by the static region determination information 116.

FIG. 1 further shows the second processor 106 providing encoded image data 122 to an interface circuit 124 (e.g., a northbridge and/or a southbridge), such as when the second processor 106 includes the video encoder with which the static region determining pre-encoding logic 112 is associated as discussed above. The interface circuit 124 may connect the processor subsystem 102 to an expansion bus 126 and may provide the encoded image data 122 to the expansion bus 126. The expansion bus 126 may further connect to, for example, a display 128 (though the display 128 may, for example, be a wireless display if desired); one or more peripheral devices 130; an additional memory 132 and one or more input/output (I/O) devices 134. If desired, executable instructions including the static region determining pre-encoding logic code 115 may be stored in the additional memory 132 in addition to or instead of being stored in the memory 108. The one or more I/O devices 144 may include, for example, one or more cellular transceivers such as a 3G or 4G transceiver; a Wi-Fi transceiver; a keypad; a touch screen; an audio input/output device or devices; a mouse; a stylus; and/or any other suitable input/output device(s).

FIG. 2 is a functional block diagram illustrating an example of further detail of the operation of the static region determining pre-encoding logic 112 associated with the video encoder. For ease of illustration and explanation, the static region determining pre-encoding logic 112 as shown as included within a video encoder 200, which in turn may be included within, for example, the second processor 106 (not shown as such in FIG. 2) as discussed above. In addition to the static region determining pre-encoding logic 112, the video encoder 200 also includes encoding logic 202 in the example of FIG. 2. FIG. 2 also illustrates the memory 108 and the power consumption control logic 110 of the example apparatus 100 of FIG. 1.

As shown in FIG. 2, the static region determining pre-encoding logic 112 receives information 204 regarding an amount of the image frame to be encoded that is static. As discussed above and as shown and described in further detail below, the information 204 may be obtained from at least one of a gaming application executing on, for example, the second processor 106 and/or the first processor 104; a display engine included in, for example, the second processor 106; a video decoder included in, for example, the second processor 106; and as a result of processing by the static region determining pre-encoding logic 112. The information 204 also or alternatively may be or may include one or more binary indications and/or coordinate information as discussed above and further described in detail below. Still further, the information 204 may be or may include at least one of information regarding a location of a static region of the image frame to be encoded and an indication of a percentage of the image frame to be encoded that is static.

The static region determining pre-encoding logic 112 generates the static region determination information 116, which as noted above indicates which regions (e.g., macroblocks) in the image frame to be encoded are static. As further described below, the static region determination information 116 may, according to various embodiments, indicate particular regions in the image frame to be encoded that are static; indicate a number or percentage of static regions in the image frame to be encoded that are static, without indicating particular regions that are static; indicate coordinates of points defining a non-static (or static, if desired) region(s) in the image frame to be encoded; or may be or may include any other suitable indication used by the power consumption control logic 110. In addition to providing the static region determination information 116 to the power consumption control logic 110, the static region determining pre-encoding logic 112 also provides the static region determination information 116 to the encoding logic 202 as further described below.

The static region determining pre-encoding logic 112 may also receive image data 206 for the image frame to be encoded and image data 208 for a previously encoded image frame. As described below, the static region determining pre-encoding logic 112 may, in some embodiments, determine a correlation between the image frame to be encoded and the previously encoded image frame by subtracting the image data 206 for the image frame to be encoded from the image data 208 for the previously encoded image frame.

The power consumption control logic 110 receives the static region determination information 116 and, in response thereto, may adjust power consumption of the video encoder 200 by adjusting (e.g., reducing) the frequency of the encoding logic clock signal 118 provided to the encoding logic 202. One or more example embodiments of determining the adjusted frequency of the encoding logic clock signal 118 are further described below.

The encoding logic 202, as noted above, also receives the static region determination information 116. Additionally, the encoding logic 202 receives the encoding logic clock signal 118 and, as shown in the example of FIG. 2, further receives the image data 206 for the image frame to be encoded and the image data 208 for the previously encoded image frame. Based on the information indicated by the static region determination information 116, the encoding logic 202 may, when encoding a particular region of the image frame to be encoded, operate in a mode (e.g., a SKIP mode) indicating that the region of the image frame to be encoded is static with respect to the previously encoded image frame. Such a mode may be any suitable reduced complexity mode and, while described herein as a SKIP mode, is not limited as such. As one example, a particular region of the image frame to be encoded that is static may be encoded using a reduced search range mode. As such, it will be understood that references herein to a SKIP mode are for ease of explanation, and it is within the scope of this disclosure for such references to be to another reduced complexity mode(s). If, for a particular region of the image frame to be encoded, the information indicated by the static region determination information 116 does not indicate that the region is static, the encoding logic 202 may use the image data 206 for the image frame to be encoded and the image data 208 for the previously encoded image frame to, for example, perform motion estimation and motion compensation in order to encode the particular region of the image frame to be encoded.

Once the entire image frame to be encoded has been encoded and the encoding is represented by the encoded image data 122, which as shown in FIG. 2 may be generated by the encoding logic 202, the encoded image data 122 may be provided for use in any suitable manner. By way of example, the encoded image data 122 may be provided to the interface circuit 124, which in turn may provide the encoded image data 122 to one or more of the I/O devices 134 via the expansion bus 126. The one or more of the I/O devices, such as a 3G or 4G transceiver, may then transmit the encoded image data 122 to another apparatus, such as to another smart phone. As just one further example, the encoded image data 122 may be provided to a video decoder of the apparatus 100 (not shown) and may be decoded and provided, via the interface circuit 124 and the expansion bus 126, for display on the display 128.

Figure 3:
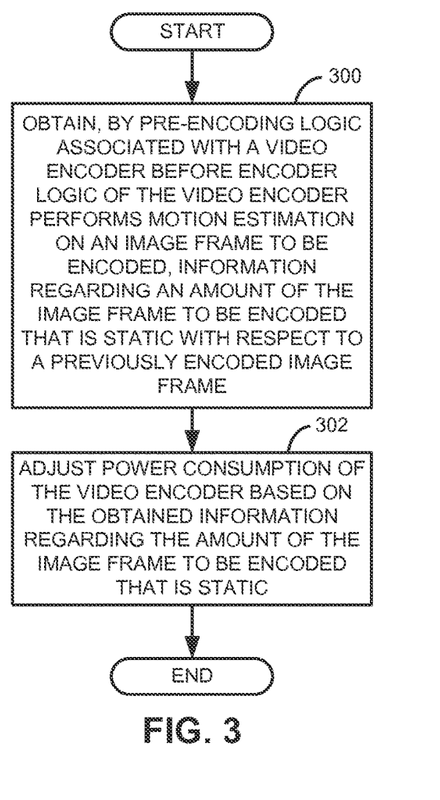
FIG. 3 is a flowchart of an example method for controlling power consumption in video encoding.

With continued reference to FIG. 2 and turning also to FIG. 3, FIG. 3 is a flowchart of an example method for controlling power consumption in video encoding. The method illustrated in FIG. 3, and each of the example methods described herein, may be carried out by one or more suitably programmed controllers or processors executing software (e.g., by the second processor 106 executing suitable instructions and by the power consumption control logic 110 when the power consumption control logic 110 is implemented as a controller or processor executing software). The method may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 3), it will be appreciated that many other ways of performing the acts associated with the method(s) may be used. For example, the order of some operations may be changed, and some of the operations described may be optional. Additionally, while the method(s) may be described with reference to the example apparatus 100, it will be appreciated that the method(s) may be implemented by other apparatus as well, and that the apparatus 100 may implement other methods.

As shown in FIG. 3, the method begins at block 300 when pre-encoding logic associated with a video encoder obtains, before encoder logic of the video encoder performs motion estimation on an image frame to be encoded, information regarding an amount of the image frame to be encoded that is static with respect to a previously encoded image frame. For example, the static region determining pre-encoding logic 112 may obtain the information 204 regarding an amount of the image frame to be encoded that is static before the encoder logic 202 of the video encoder 200 performs motion estimation on the image frame to be encoded.

As shown in block 302, power consumption control logic, such as the power consumption control logic 110, then adjusts power consumption of the video encoder (e.g., the video encoder 200) based on the obtained information (e.g., the information 204) regarding the amount of the image frame to be encoded that is static.

Figure 4:
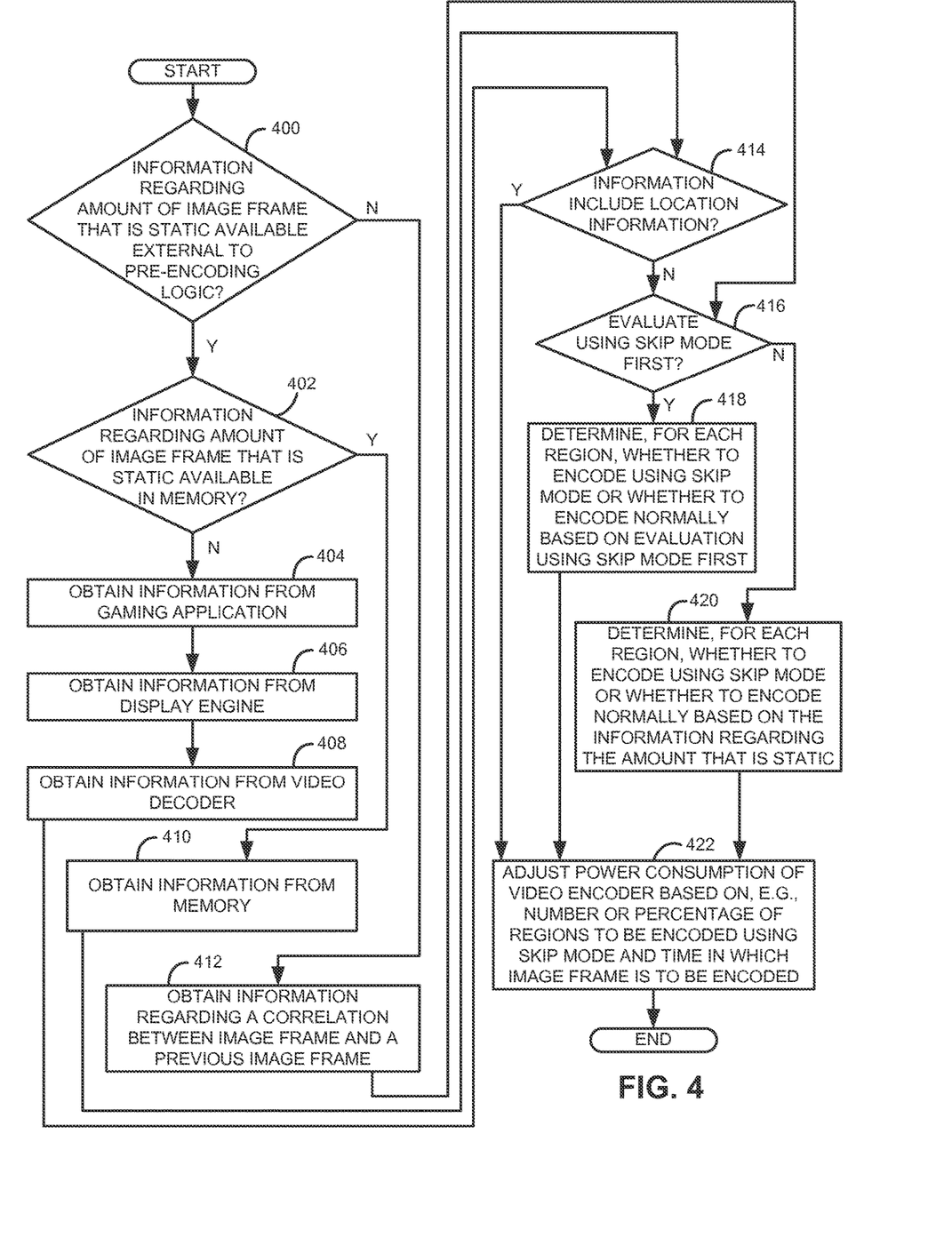
FIG. 4 is a flowchart of another example method for controlling power consumption in video encoding and includes aspects of the method illustrated in FIG. 3 in more detail.
Figure 5:
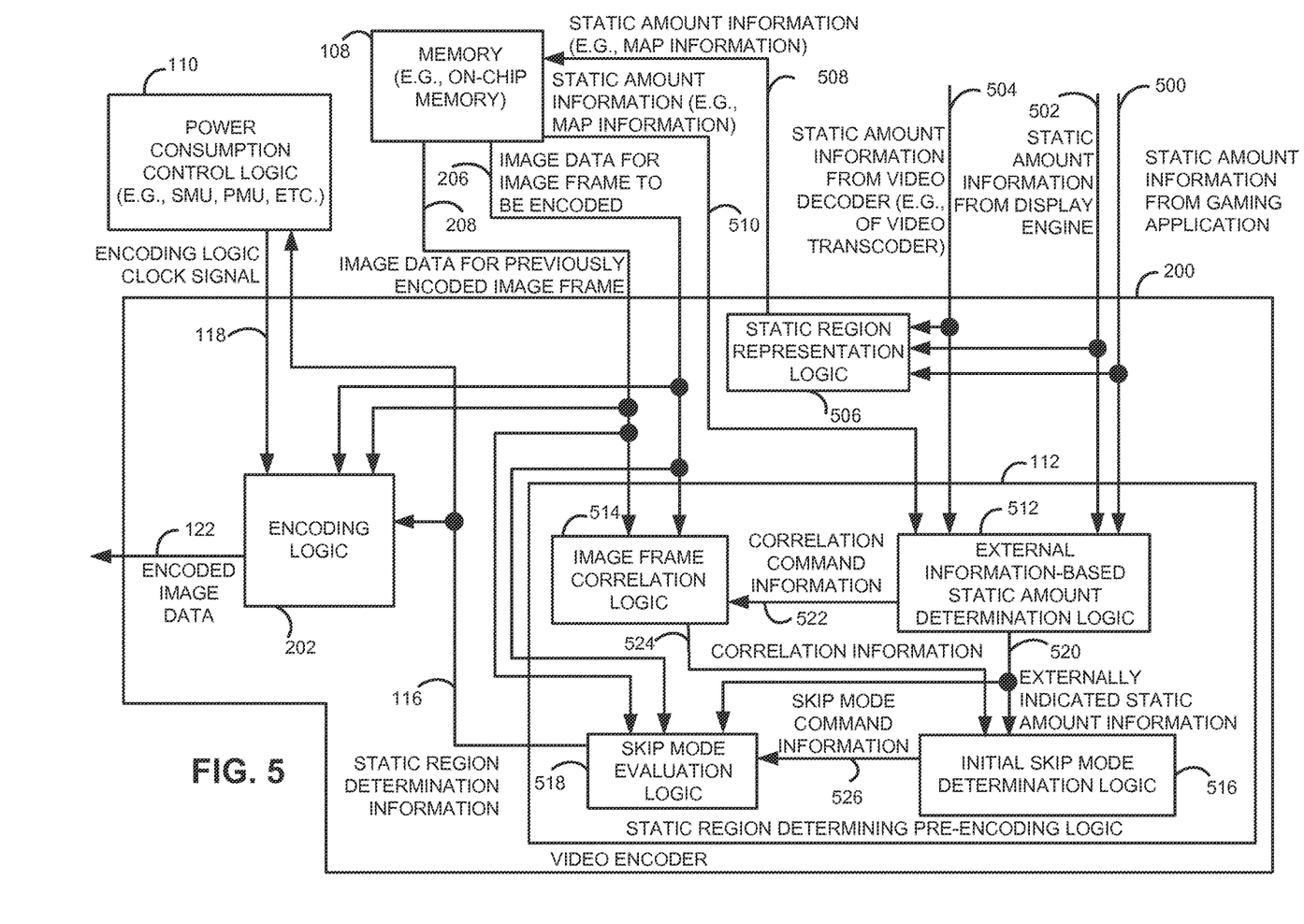
FIG. 5 is a functional block diagram illustrating an example of still further detail of the operation of the pre-encoding logic associated with the video encoder, an example of further detail of the operation of the video encoder, and an example of detail of obtained information regarding the amount of the image frame to be encoded that is static.

Turning now to FIGS. 4 and 5, FIG. 4 is a flowchart of another example method for controlling power consumption in video encoding and includes aspects of the method illustrated in FIG. 3 in more detail. FIG. 5, which will be discussed in conjunction with FIG. 4, is a functional block diagram illustrating an example of still further detail of the operation of the static region determining pre-encoding logic 112 associated with the video encoder 200, an example of further detail of the operation of the video encoder 200, and an example of further detail of the information 204 regarding the amount of the image frame to be encoded that is static.

As shown in FIG. 4 in block 400, the method may include determining whether the information 204 regarding the amount of the image frame to be encoded that is static with respect to a previously encoded image frame is available external to the static region determining pre-encoding logic 112. For example, it may be determined in block 400 whether the information 204 is available from, for example, a gaming application, such as from a gaming application that may set one or more flags indicating static regions and their locations and/or the percentage of the image frame to be encoded that is static; a display engine; and/or a video decoder, such as from a video decoder that provides information regarding static regions of the image frame to be encoded after the video decoder has decoded image data to generate the image frame to be encoded (e.g., as in the case of transcoding). It may also or alternatively be determined in block 400 whether the information 204 is available in the form of a binary indication(s), coordinate information, etc. from a memory (e.g., the memory 108), as discussed above and as further described below. If it is determined that the information 204 regarding the amount of the image frame to be encoded that is static is available external to the static region determining pre-encoding logic 112, flow may proceed to block 402. If it is determined that the information 204 regarding the amount of the image frame to be encoded that is static is not available external to the static region determining pre-encoding logic 112, flow may proceed to block 412.

In the event that flow proceeds to block 402, it may be determined whether the information 204 regarding the amount of the image frame to be encoded that is static is available in memory, such as in the memory 108. With reference to FIG. 5, the video encoder 200 may receive the information 204 as one or more of static amount information 500 from a gaming application or applications, static amount information 502 from a display engine, and static amount information 504 from a video decoder (e.g., of a video transcoder that includes the video encoder 200). While FIG. 5 shows that the information 500, 502, and/or 504 may be provided to the static region determining pre-encoding logic 112, the information 500, 502, and/or 504 may also or alternatively be provided to static region representation logic 506 of the video encoder 200. The static region representation logic 506 may, in some examples, generate a binary indication for each region of the image frame to be encoded. In an embodiment, the static region representation logic 506 may generate its output so that the binary indication for each region is mapped to the location of that region in the image frame. For example, in an embodiment where a "0" is used to indicate that a region is not static, and a "1" is used to indicate that a region is static, the static region representation logic 506 may generate the binary values as a binary map that indicates which binary values correspond to which regions (e.g., macroblocks) within the image frame to be encoded.

In some examples, the static region representation logic 506 may also or alternatively generate coordinate information indicating a region or regions of the image frame to be encoded that is/are not static. For example, in the case of a rectangular region of the image frame that is not static, where the rectangular region includes, for example, two side-by-side macroblocks, the static region representation logic 506 may generate information indicating the upper left-most coordinate of the left macroblock and the lower right-most coordinate of the right macroblock. In some implementations, the static region representation logic 506 may also generate an indication of the geometry to which the coordinates apply, e.g., in the above example, that the coordinates are opposing coordinates of a rectangular, non-static region. Furthermore, in some embodiments, the coordinate information may indicate a region or regions of the image frame to be encoded that is/are static, as opposed to not static. In any event, when the coordinate information is generated in addition to the binary indication of whether each region to be encoded is static, the static region determining pre-encoding logic 112 may use the coordinate information as a redundant check on the binary indication of whether each region to be encoded is static, and as further discussed below, may determine to treat a particular region to be encoded as a static region if both the coordinate information and the binary indication indicate that the particular region of the image frame to be encoded is a static region.

The binary indication of whether each region to be encoded is static, and/or the coordinate information indicating a region of the image frame that is not static, may be provided as static amount information 508 to the memory 108 or to another suitable memory such as the additional memory 132. The static amount information 508 may be or may include map information in the case of a binary indication(s) as discussed above. In some embodiments, the static region representation logic 506 may compress the binary indication(s) and/or the coordinate information and thereby provide the static amount information 508 to the memory 108 in a compressed form for more efficient memory use and bandwidth between, for example, the second processor 106 and the memory 108.

As further shown in block 402, if it is determined that the information 204 regarding the amount of the image frame to be encoded that is static is available in memory, such as by way of storage of the static amount information 508 in the memory 108, flow may proceed to block 410. If at block 402, it is determined that the information 204 regarding the amount of the image frame to be encoded that is static is not available in memory, flow may proceed to block 404.

In the event that flow proceeds to block 404, it will have been determined that the information 204 regarding the amount of the image frame to be encoded that is static is available external to the static region determining pre-encoding logic 112, but is not available in memory. Accordingly, in some examples, the method may include obtaining the information 204 or a portion thereof from a gaming application (or applications) as the static amount information 500 discussed above. Additionally or alternatively, as shown in block 406, the method may include obtaining the information 204 or a portion thereof from a display engine as the static amount information 502 discussed above. As shown in block 408, in addition to or as an alternative to obtaining the information 204 or a portion thereof from a gaming application(s) and/or from a display engine, the method may include obtaining the information 204 or a portion thereof from a video decoder as the static amount information 504 discussed above.

It will be understood that one or more of blocks 404, 406, and 408, among other blocks as mentioned above, may be omitted depending upon whether the information 204 includes the static amount information 500 from a gaming application, the static amount information 502 from a display engine, and/or the static amount information 504 from a video encoder.

In the event that flow proceeds from block 402 to block 410, it will have been determined that the information 204 regarding the amount of the image frame to be encoded that is static is available in memory. Thus, as shown in block 410, the method may include obtaining the information 204 from memory. With reference to the discussion above, the method may thus include obtaining static amount information 510 from the memory 108. In one embodiment, the static amount information 510 may represent the same information as the static amount information 508 provided to the memory 108, and may be in a compressed form because the static amount information 508 may have been compressed for greater efficiency. If the static amount information 510 is in a compressed form, the static region determining pre-encoding logic 112 may perform suitable decompression of the compressed static amount information 510. However, in other embodiments, the static amount information 510 may be information that has been stored in the memory 108 in any other suitable way, and need be the same as the static amount information 508 obtained from the encoder.

It will be understood in light of the foregoing disclosure that the information 204 regarding the amount of the image frame to be encoded that is static may be or may include one or more of the static amount information 500, the static amount information 502, the static amount information 504, and/or the static amount information 510, depending upon the source of the information 204.

With continued reference to FIG. 5, the example of further detail of the static region determining pre-encoding logic 112 shows that the static region determining pre-encoding logic 112 may include external information-based static amount determination logic 512, image frame correlation logic 514, initial SKIP mode (or other suitable mode indicating that a region to be encoded is static) determination logic 516, and SKIP mode (or other suitable mode indicating that a region to be encoded is static) evaluation logic 518. The external information-based static amount determination logic 512 may receive the static amount information 500, 502, 504, and/or 510 depending upon the source of the information 504. If the external information-based static amount determination logic 512 receives the static amount information 510 in a compressed form, the external information-based static amount determination logic 512 may perform suitable decompression thereof, as discussed above. In response to receiving one or more of the static amount information 500, 502, 504, and 510, the external information-based static amount determination logic 512 may generate and provide externally indicated static amount information 520 to the initial SKIP mode determination logic 516 and the SKIP mode evaluation logic 518.

The external information-based static amount determination logic 512 may generate the externally indicated static amount information 520 in any suitable manner, such as any suitable manner indicating a location and/or percentage of static regions as indicated in the one or more of the static amount information 500, 502, 504, and 510 received by the external information-based static amount determination logic 512. For example, the external information-based static amount determination logic 512 may combine information regarding the location of static regions in the image frame to be encoded if the external information-based static amount determination logic 512 receives more than one of the static amount information 500, 502, 504, and 510. In another example, the external information-based static amount determination logic 512 may receive more than one indication of a percentage of the image frame to be encoded that is static by way of receiving more than one of the static amount information 500, 502, 504, and 510. In one embodiment, the external information-based static amount determination logic 512 may, for example, average the more than one received indication of a percentage of the image frame that is static, and may provide the average as the externally indicated static amount information 520.

As noted above, if it is determined in block 400 that the information 204 regarding the amount of the image frame to be encoded that is static is not available external to the static region determining pre-encoding logic 112, flow may proceed to block 412. The method may then include obtaining information regarding a correlation between the image frame to be encoded and a previous image frame. For example, block 412 may include obtaining a result of a correlation between the image frame to be encoded and the previous image frame before encoding of the previous image frame. Additionally or alternatively, the information regarding the correlation between the image frame to be encoded and the previous image frame may be determined by obtaining a result of a correlation between the image frame to be encoded and the previous image frame after encoding of the previous image frame for use as a reference for future frames (including the image frame to be encoded).

With continued reference to block 412 and with reference to FIG. 5, in response to not receiving any information external to the video encoder 200 regarding the amount of the image frame to be encoded that is static, the external information-based static amount determination logic 512 may generate and provide correlation command information 522 to the image frame correlation logic 514 to cause the image frame correlation logic 514 to obtain the information regarding the correlation between the image frame to be encoded and the previously encoded image frame. As shown in FIG. 5, the image frame correlation logic 514 may receive both the image data 206 for the image frame to be encoded and the image data 208 for the previously encoded image frame. The image frame correlation logic 514 may, in one example, perform the correlation by subtracting the image data 206 for the image frame to be encoded from the image data 208 for the previously encoded image frame (before and/or after encoding of the previously encoded image frame, as discussed above). The image frame correlation logic 514 may then generate and provide correlation information 524 to the initial SKIP mode determination logic 516.

As shown in FIG. 4, flow may proceed from each of blocks 408 (or, for example, from block 404 or block 406, in a situation where block 408 is omitted as described above) and 410 to block 414. Additionally, flow may proceed from block 412 to block 416. At block 414, it may be determined whether the obtained information 204 includes location information as opposed to, for example, percentage information indicating a percentage of the image frame to be encoded that is static. As discussed above, the location information may be or may include, for example, a binary indication of whether each region to be encoded is static, and/or coordinate information indicating a region or regions of the image frame to be encoded that is/are not static, and/or any other suitable information. In the event that the obtained information 204 includes location information, flow may proceed to block 422. In the event that the obtained information does not include location information, flow may proceed to block 416.

In the event that flow proceeds to block 416, it may be determined whether to evaluate each region (e.g., each macroblock) of the image frame to be encoded using the SKIP mode first. That is, it may be determined whether, by default, each region of the image frame is to be evaluated first using the SKIP mode to determine whether to encode that region of the image frame using the SKIP mode.

For example, with reference to FIG. 5, the initial SKIP mode determination logic 516 may receive the externally indicated static amount information 520 and may use the received information 520 to determine the percentage of static regions in the image frame. In some examples, the received information may directly indicate the percentage of static regions in the image frame to be encoded, such as, for example, when the static amount information 500 from a gaming application indicates the percentage of static regions in an image frame of the gaming application that is to be encoded. In other examples, the correlation information 524 may directly indicate the percentage of regions of the image frame to be encoded that are static, and may further indicate which particular regions have been determined to be static as a result of the correlation. However, in some embodiments, in order to allow for the possibility of error in the correlation, the correlation information 524 may still be provided to the initial SKIP mode determination logic 516 for determination of whether the SKIP mode is to be used as a default (hence the illustration of flow proceeding from block 412 to block 416). For example, even though the correlation information 524 may directly indicate which particular regions have been determined to be static as a result of the correlation, if the percentage of regions in the image frame that have been determined to be static as a result of the correlation does not exceed a threshold, the initial SKIP mode determination logic 516 may determine not to use the SKIP mode as a default. The implementation of a threshold percentage of static regions in the image frame is further discussed below.

In the example where the initial SKIP mode determination logic 516 determines the percentage of static regions in the image frame to be encoded, the initial SKIP mode determination logic 516 may determine whether the percentage of static regions in the image frame to be encoded exceeds a threshold percentage. The threshold percentage may, for example, be pre-programmed into the initial SKIP mode determination logic 516 or may be indicated in executable instructions that are executed by, for example, the second processor 106 to implement the initial SKIP mode determination logic 516. In one embodiment, if the determined percentage of static regions in the image frame to be encoded exceeds the threshold percentage, the initial SKIP mode determination logic 516 may determine that, by default, each region of the image frame is to be evaluated first using the SKIP mode to determine whether to encode that region using the SKIP mode. In this manner, it may be determined at block 416 that each region of the image frame is to be encoded using the SKIP mode first (and subsequently evaluated to determine whether the SKIP mode is the proper mode for that region).

Among other advantages, by evaluating each region of the image frame to be encoded using the SKIP mode first when the percentage of static regions exceeds a threshold percentage, computationally-intensive motion estimation may be avoided when it is likely that the motion estimation will not be needed for a significant number of regions. Evaluating a particular region of the image frame to be encoded using the SKIP mode first may end up costing computation time when that evaluation indicates that the particular region should not, in fact, be encoded using the SKIP mode. However, in the above examples, the threshold percentage may be set so that the expected savings in computation outweigh the expected costs in computation resulting from forcing an initial evaluation of each region of the image frame using the SKIP mode when any such region should not in fact be encoded using the SKIP mode.

With continued reference to block 416, if it is determined that each region (e.g., each macroblock) of the image frame is to be evaluated for encoding using the SKIP mode first, flow may proceed to block 418. If it is determined that each region of the image frame is not to be encoded using the SKIP mode first, flow may proceed to block 420.

In the event that flow proceeds to block 418, the method may include determining, for each region of the image frame to be encoded, whether to encode the image frame using the SKIP mode or whether to encode the image frame normally (e.g., using motion estimation and motion compensation) based on evaluation of the region using the SKIP mode first. With reference to FIG. 5, when the initial SKIP mode determination logic 516 determines whether each region of the image frame is to be evaluated first using the SKIP mode, the initial SKIP mode determination logic 516 may generate and provide SKIP mode command information 526 to the SKIP mode evaluation logic 518. The SKIP mode command information 526 may indicate to the SKIP mode evaluation logic 518 that each region of the image frame is to be evaluated first using the SKIP mode. As further shown in FIG. 5, the SKIP mode evaluation logic 518 may receive both the image data 206 for the image frame to be encoded and the image data 208 for the previously encoded image frame. The SKIP mode evaluation logic 518 may then use the image data 206 and the image data 208 to evaluate the SKIP mode for each region of the image frame to be encoded by evaluating the suitability of the SKIP mode first before evaluating any motion vectors. After determining whether to encode each region of the image frame using the SKIP mode or normally, the SKIP mode evaluation logic 518 may provide an indication of this determination as the static region determination information 116.

After it is determined, for each region of the image frame to be encoded, whether to encode the image frame using the SKIP mode or whether to encode the image frame normally based on evaluation of each region using the SKIP mode first, flow may proceed to block 422. As discussed with respect to FIGS. 1 and 2 and as further discussed below, the static region determination information 116 may be provided to the power consumption control logic 110 to adjust power consumption of the video encoder 200 by adjusting the encoding logic clock signal 118.

In the event that flow proceeds from block 416 to block 420, it will have been determined that each region of the image frame is not to be encoded using the SKIP mode first in the example of FIG. 4. As shown in block 420, the method may include determining, for each region of the image frame to be encoded, whether to encode the image frame using the SKIP mode or whether to encode the image frame normally based on the information 204 regarding the amount of the image frame to be encoded that is static. For example, the external information-based static amount determining logic 512 may receive information indicating particular regions of the image frame to be encoded that are static, but the percentage of the image frame to be encoded that is static may not exceed the threshold that causes each region of the image frame to be evaluated first using the SKIP mode (e.g., block 418). In this example, the initial SKIP mode determination logic 516 may generate the SKIP mode command information 526 to indicate to the SKIP mode evaluation logic 518 that the externally indicated static amount information 520 or the correlation information 524, as the case may be, is to be passed through to the output of the SKIP mode evaluation logic 518 as the static region determination information 116. Flow may then proceed to block 422.

Figure 6:
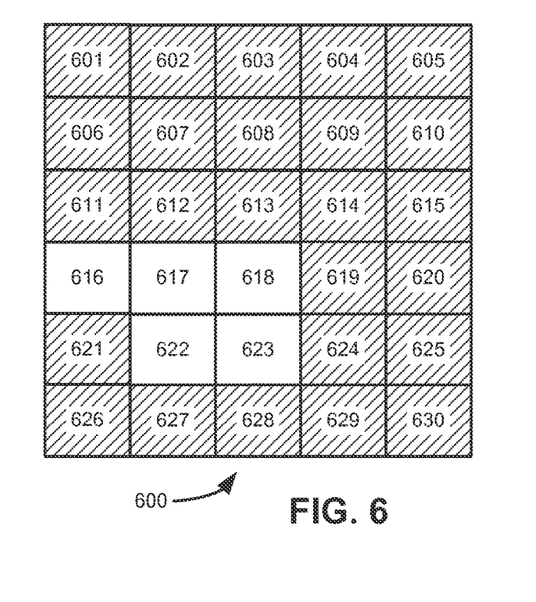
FIG. 6 illustrates an image frame to be encoded that includes both regions that have been indicated as or determined to be static and regions that have been indicated as or determined to be non-static.

As shown in block 422, the method may include adjusting power consumption of the video encoder 200 based on, for example, the number or percentage of regions in the image frame to be encoded that are to be encoded using the SKIP mode and the time in which the image frame is to be encoded. For example, FIG. 6 illustrates an image frame 600 to be encoded that includes regions 601 through 630. For ease of explanation, each of the regions 601 through 630 will be described as a 16×16 macroblock—that is, 16 pixels horizontally by 16 pixels vertically. It will be understood that in applications such as use of the disclosed embodiments in smart phones, tablets, etc., significantly more pixels and thus, potentially, significantly more regions, will be included in an image frame to be encoded.

In the example of FIG. 6, the hatched regions are those that have been indicated in the static region determination information 116 to be static according to, for example, one or more of the example techniques described above. The unhatched regions are those that have been indicated in the static region determination information 116 not to be static. As can be seen from the example of FIG. 6, only the regions 616, 617, 618, 622, and 623 are not static. The remaining twenty-five (25) hatched regions have been indicated to be static. Adjusting power consumption of the video encoder 200 may thus include, in this example: (1) determining the number of clock cycles needed to encode a 16×16 macroblock as SKIP; (2) multiplying the number of clock cycles needed to encode a 16×16 macroblock as SKIP by twenty-five (25), which is the number of indicated static regions in this example; (3) determining the number of clock cycles needed to encode a 16×16 macroblock when not using SKIP mode; (4) multiplying the number of clock cycles needed to encode a 16×16 macroblock when not using SKIP mode by five (5), which is the number of regions in the example image frame 600 that have been indicated not to be static; (5) adding the numbers of clock cycles determined in actions (2) and (4) to determine the total number of clock cycles needed to encode the image frame 600; and (6) dividing the total number of clock cycles needed to encode the image frame 600 as determined in action (5) by the time in which the image frame is to be encoded in order to determine the frequency of the encoding logic clock signal 118. A margin of error may also be added by increasing the determined frequency of the encoding logic clock signal 118 by a particular percentage, such as 10%, or a margin of error may be added to the process of determining the frequency of the encoding logic clock signal 118 in any other suitable manner.

The video encoder 200, with power consumption adjusted by, for example, adjusting the frequency of the encoding logic clock signal 118, may then encode the image frame using the encoding logic 202. In addition to receiving the encoding logic clock signal 118, the encoding logic 202 may receive the image data 206 for the image frame to be encoded, the image data 208 for the previously encoded image frame, and the static region determination information 116 as discussed above. The encoding logic 202 may then, for example, perform motion estimation and motion compensation in encoding the image frame represented by the image data 206 and generating the encoded image data 122.

As discussed above, in the event that the obtained information 204 includes location information, flow may proceed from block 414 to block 422. In this situation, the obtained information 204 may simply be passed from the input of the static region determining pre-encoding logic 112 to the output of the static region determining pre-encoding logic 112 as the static region determination information 116. For example, the external information-based static amount determination logic 512 and, in some examples, the initial SKIP mode determination logic 516 and/or the SKIP mode evaluation logic 518, may pass the obtained information 204 through to the output of the static region determining pre-encoding logic 112 as the static region determination information 116.

It will be appreciated that, in some examples, the actions described with respect to one or more of blocks 400 through 412 of FIG. 4 may be used to implement the actions described with respect to block 300 of FIG. 3, and that the actions described with respect to one or more of blocks 414 through 422 may be used to implement the actions described with respect to block 302.

Figure 7:
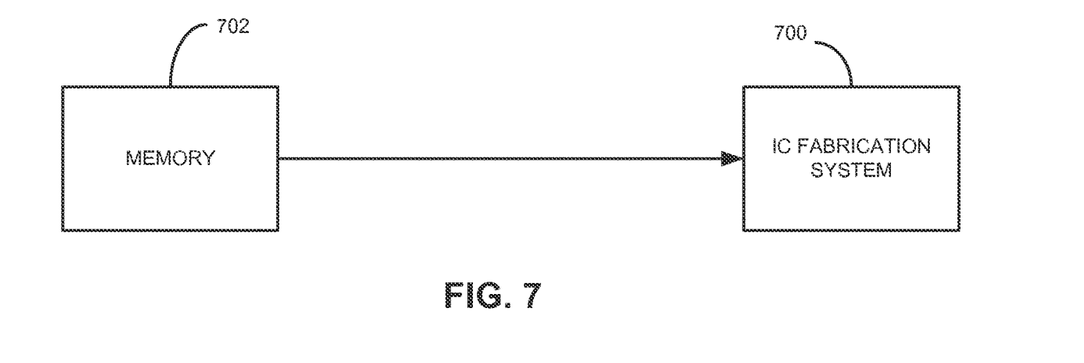
FIG. 7 is a functional block diagram illustrating one example of an integrated circuit fabrication system.

Referring to FIG. 7, an integrated circuit fabrication system 700 is shown which may include access to memory 702, which may be in any suitable form and any suitable location accessible via the web, accessible via hard drive or any other suitable way. The memory 702 is a non-transitory computer readable medium such as but not limited to RAM, ROM, and any other suitable memory. The IC fabrication system 700 may be one or more work stations that control a wafer fabrication to build integrated circuits. The memory 702 may include thereon instructions that when executed by one or more processors causes the integrated circuit fabrication system 700 to fabricate one or more integrated circuits that include the logic and structure described herein.

The disclosed integrated circuit designs may be employed in any suitable apparatus including but not limited to, for example, a mobile or smart phone, a phablet, a tablet, a camera, a laptop computer, a portable media player, or any other suitable device which employs video encoding. Such devices may include, for example, a display that receives image data (e.g., image data that has been decoded and that corresponds to the encoded image data 122) from the one or more integrated circuits where the one or more integrated circuits may be or may include, for example, an APU, GPU, CPU or any other suitable integrated circuit(s) that provide(s) image data for output on the display. Such an apparatus may employ one or more integrated circuits as described above including the static region determining pre-encoding logic, the power consumption control logic, and other components described above.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and structure described herein may also be produced as one or more integrated circuits by such systems using the computer readable medium with instructions stored therein. For example, one or more integrated circuits with the aforedescribed logic and structure may be created using such integrated circuit fabrication systems. In such a system, the computer readable medium stores instructions executable by one or more integrated circuit design systems that causes the one or more integrated circuit design systems to produce one or more integrated circuits. The one or more integrated circuits include, for example, static region determining pre-encoding logic and power consumption control logic that allow a reduction in the number of computations that are performed to encode an image frame based on information regarding an amount of the image frame that is static, as described above.

Among other advantages, for example, the disclosed methods and apparatus allow adjustment of the power consumption of a video encoder based on information regarding an amount of an image frame to be encoded that is static, thus avoiding the need to perform many motion estimation calculations and other resource-intensive computations. The disclosed methods and apparatus also provide various ways in which the information regarding the amount of the image frame to be encoded that is static may be provided. For example, the information may advantageously be provided by indicating the locations of static regions in the image frame, the percentage of static regions in the image frame, by performing a correlation, or in various other suitable ways. Using the information regarding the amount of the image frame to be encoded that is static as described herein allows fewer computations to be performed while still encoding an image frame in the time desired. Other advantages will be recognized by one of ordinary skill in the art.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method for controlling power consumption in video encoding, the method comprising:
   obtaining, by pre-encoding logic associated with a video encoder before encoder logic of the video encoder performs motion estimation on an image frame to be encoded, external information that is generated external from the encoder logic and indicates a quantitative amount of the image frame to be encoded that is static with respect to a previously encoded image frame, the external information indicating the amount of the image frame to be encoded that is static indicating that some portions of the image frame are to be encoded as static and other portions of the image frame are to be encoded as not static and wherein obtaining the external information indicating the amount of the image frame to be encoded that is static comprises obtaining the external information from one or more of: a gaming application that generates the external information, and a video decoder that generates the external information;
   adjusting power consumption of the video encoder based on the obtained external information indicating the amount of the image frame to be encoded that is static; and
   wherein adjusting the power consumption of the video encoder comprises adjusting a clock frequency of the video encoder based on the external information indicating the amount of the image frame to be encoded that is static.

2. The method of claim 1, wherein obtaining the external information indicating the amount of the image frame to be encoded that is static comprises obtaining a binary indication of whether each of a plurality of regions of the image frame to be encoded is static.

3. The method of claim 1, wherein obtaining the external information indicating the amount of the image frame to be encoded that is static comprises obtaining coordinate external information indicating a region of the image frame to be encoded that is not static.

4. The method of claim 1, wherein obtaining the external information indicating the amount of the image frame to be encoded that is static comprises obtaining at least one of external information indicating a location of a static region of the image frame to be encoded and an indication of a percentage of the image frame to be encoded that is static.

5. The method of claim 4, comprising determining, based on the percentage of the image frame to be encoded that is static, whether to adjust an operating mode of the video encoder to an operating mode indicating that a region of the image frame to be encoded is static.

6. The method of claim 1, wherein obtaining the external information indicating the amount of the image frame to be encoded that is static comprises obtaining external information indicating a correlation between the image frame to be encoded and the previously encoded image frame.

7. An apparatus for controlling power consumption in video encoding, the apparatus comprising:
   pre-encoding logic operative to obtain, before encoder logic of a video encoder performs motion estimation on an image frame to be encoded, external information that is generated external from the encoder logic and indicates a quantitative amount of the image frame to be encoded that is static with respect to a previously encoded image frame, the external information indicating the amount of the image frame to be encoded that is static indicating that some portions of the image frame are to be encoded as static and other portions of the image frame are to be encoded as not static and wherein the pre-encoding logic is operative to obtain the external information indicating the amount of the image frame to be encoded that is static from one or more of: a gaming application that generates the external information, a video decoder that generates the external information, and a result of a correlation between the image frame to be encoded and the previously encoded image frame;
   power consumption control logic operatively coupled to the pre-encoding logic and operative to adjust power consumption of the video encoder based on the obtained external information indicating the amount of the image frame to be encoded that is static; and
   wherein the power consumption control logic is operative to adjust a clock frequency of the video encoder based on the external information indicating the amount of the image frame to be encoded that is static in order to adjust power consumption of the video encoder.

8. The apparatus of claim 7, wherein the pre-encoding logic is operative to obtain the external information indicating the amount of the image frame to be encoded that is static as at least one of a binary indication of whether each of a plurality of regions of the image frame to be encoded is static and coordinate external information indicating a region of the image frame to be encoded that is not static.

9. The apparatus of claim 7, wherein the pre-encoding logic is operative to obtain at least one of external information indicating a location of a static region of the image frame to be encoded and an indication of a percentage of the image frame to be encoded that is static in order to obtain the external information indicating the amount of the image frame to be encoded that is static, and wherein the pre-encoding logic comprises mode determination logic that is operative to determine, based on the percentage of the image frame to be encoded that is static, whether to adjust an operating mode of the video encoder to an operating mode indicating that a region of the image frame to be encoded is static.

10. The apparatus of claim 7, comprising at least one of an accelerated processing unit (APU), a central processing unit (CPU), a graphics processing unit (GPU), wherein the at least one of the APU, the CPU, and the GPU includes the pre-encoding logic, the power consumption control logic, and the video encoder.

11. The apparatus of claim 10, comprising:
   a display; and
   a video decoder operative to:
   receive encoded image data from the video encoder;
   decode the received encoded image data to generate decoded image data; and
   provide the decoded image data for display on the display.

12. A non-transitory computer readable medium comprising executable instructions that when executed cause an integrated circuit (IC) fabrication system to fabricate one or more ICs that comprise:
   pre-encoding logic operative to obtain, before encoder logic of a video encoder performs motion estimation on an image frame to be encoded, external information that is generated external from the encoder logic and indicates a quantitative amount of the image frame to be encoded that is static with respect to a previously encoded image frame, the external information indicating the amount of the image frame to be encoded that is static indicating that some portions of the image frame are to be encoded as static and other portions of the image frame are to be encoded as not static and wherein the pre-encoding logic is operative to obtain the external information indicating the amount of the image frame to be encoded that is static from one or more of: a gaming application that generates the external information, a video decoder that generates the external information, and a result of a correlation between the image frame to be encoded and the previously encoded image frame;

power consumption control logic operatively coupled to the pre-encoding logic and operative to adjust power consumption of the video encoder based on the obtained external information indicating the amount of the image frame to be encoded that is static; and executable instructions that when executed cause the IC fabrication system to fabricate the one or more ICs such that the power consumption control logic is operative to adjust a clock frequency of the video encoder based on the external information indicating the amount of the image frame to be encoded that is static in order to adjust power consumption of the video encoder.

13. The non-transitory computer readable medium of claim 12 comprising executable instructions that when executed cause the IC fabrication system to fabricate the one or more ICs such that the pre-encoding logic is operative to obtain the external information indicating the amount of the image frame to be encoded that is static as at least one of a binary indication of whether each of a plurality of regions of the image frame to be encoded is static and coordinate external information indicating a region of the image frame to be encoded that is not static.

14. The non-transitory computer readable medium of claim 12 comprising executable instructions that when executed cause the IC fabrication system to fabricate the one or more ICs such that the one or more ICs further comprise:
the video encoder; and
a video decoder operative to:
receive encoded image data from the video encoder;
decode the received encoded image data to generate decoded image data; and
provide the decoded image data for display on a display.

\* \* \* \* \*